United States Patent
Ludewigt et al.

(10) Patent No.: US 7,356,066 B2
(45) Date of Patent: Apr. 8, 2008

(54) SOLID STATE LASER

(75) Inventors: Klaus Ludewigt, Oststeinbeck (DE); Frank-Peter Grundmann, Hamburg (DE)

(73) Assignee: Rofin Sinar Laser GmbH, Hamburg (DE)

(*) Notice: Subject to any disclaimer, the term of this patent is extended or adjusted under 35 U.S.C. 154(b) by 0 days.

(21) Appl. No.: 11/396,992

(22) Filed: Apr. 3, 2006

(65) Prior Publication Data

US 2006/0176926 A1  Aug. 10, 2006

Related U.S. Application Data

(63) Continuation of application No. PCT/EP2005/001869, filed on Feb. 23, 2005.

(30) Foreign Application Priority Data

Feb. 27, 2004  (DE)  ............ 10 2004 009 593

(51) Int. Cl.
*H01S 3/081* (2006.01)
(52) U.S. Cl. .......................... 372/93; 372/92
(58) Field of Classification Search .......... 372/36, 372/35, 92, 72, 75
See application file for complete search history.

(56) References Cited

U.S. PATENT DOCUMENTS

| | | | |
|---|---|---|---|
| 5,131,002 A | 7/1992 | Mooradian | |
| 5,553,088 A * | 9/1996 | Brauch et al. | 372/34 |
| 6,339,605 B1 * | 1/2002 | Vetrovec | 372/35 |
| 6,363,090 B1 | 3/2002 | Wintner et al. | |
| 6,810,060 B2 * | 10/2004 | Vetrovec | 372/68 |
| 2003/0058915 A1 | 3/2003 | Kumkar | |

FOREIGN PATENT DOCUMENTS

| | | |
|---|---|---|
| EP | 0 831 567 A1 | 4/1997 |
| EP | 1 231 683 A2 | 2/2002 |
| WO | WO 01/43242 A1 | 12/2000 |

OTHER PUBLICATIONS

XP-001020252 "Widely tunable pulse duration from a passively mode-locked thin-disk Yb:YAG laser", (Brunner, et al), Optics Letters, vol. 26, No. 6, dated Oct. 16, 2000.

* cited by examiner

*Primary Examiner*—Minsun Oh Harvey
*Assistant Examiner*—Tuan N. Nguyen
(74) *Attorney, Agent, or Firm*—Laurence A. Greenberg; Werner H. Stemer; Ralph E. Locher

(57) ABSTRACT

A solid body laser has a crystal disk forming its laser active medium. A flat side of the crystal disk is totally reflecting. A resonator mirror configuration includes a partially transparent end mirror and one or more folding mirrors, which are disposed with spatial separation from the crystal disk, and the optical axes of the mirrors extend in an inclined manner on the central axis of the crystal disk in such manner that the laser beam which is diffused inside the resonator mirror configuration impinges upon the folding mirror at an oblique angle.

6 Claims, 4 Drawing Sheets

SOLID STATE LASER

CROSS-REFERENCE TO RELATED APPLICATION

This is a continuing application, under 35 U.S.C. § 120, of copending international application PCT/EP2005/001869, filed Feb. 23, 2005, which designated the United States; this application also claims the priority, under 35 U.S.C. § 119, of German patent application No. 10 2004 009 593.0, filed Feb. 27, 2004; the prior applications are herewith incorporated by reference in their entirety.

BACKGROUND OF THE INVENTION

Field of the Invention

The invention relates to a solid state laser wherein a thin crystal wafer is used as the active laser medium.

Such a solid state laser, also referred to in the literature as a wafer laser, is known for example from U.S. Pat. No. 5,553,088 and German patent DE 199 39 774. That device contains, as the active laser medium, a thin crystal wafer only a few tenths of a millimeter to a few millimeters thick, typically having a diameter of the order of about 10 mm, which is provided with a reflective layer on one flat side and with an anti-reflective layer on the opposite flat side. The laser output power generated by such a wafer laser is determined inter alia by the power absorbed in the crystal wafer from a pump light beam used for optical pumping. There are in principle two possible ways of injecting the pump light beam into the crystal wafer. The pump light beam may be injected either on a flat side of the crystal wafer (longitudinally) or on the narrow side (transversely or radially). The greater the intensity of the pump light beam and the greater the surface area excited by it—in a transverse pump configuration this is the entire surface of the crystal wafer, and in a longitudinal pump configuration the excitation surface illuminated by the pump light beam—the greater is the extractable power.

The maximum pump intensity, however, is limited since an excessive pump intensity can lead to optical perturbations or to fracture of the crystal wafer due to excessive thermal loading. For a wafer laser with a Yb:YAG crystal, this maximum pump intensity is about 5 to 10 kW/cm$^2$. With typical efficiencies of 50%, it is thus possible to achieve a laser power of at most 2.5 to 5 kW/cm$^2$. It is therefore possible to increase the laser power of a single crystal wafer only by increasing the excitation surface employed. With an increasing excitation surface for a given resonator, however, the number of transverse modes is increased and the beam quality of the laser beam is degraded.

SUMMARY OF THE INVENTION

It is accordingly an object of the invention to provide a solid state laser, which overcomes the above-mentioned disadvantages of the heretofore-known devices and methods of this general type and which provides for a solid state laser with a thin crystal wafer forming the active laser medium, which can generate a laser beam with a high power as well as good beam quality.

With the foregoing and other objects in view there is provided, in accordance with the invention, a solid state laser, comprising:

a crystal wafer forming an active laser medium of the laser, the crystal wafer having a totally reflective flat side and having a mid-axis; and a resonator mirror configuration spatially separated from the crystal wafer, the resonator mirror configuration including a semitransparent end mirror and at least one folding mirror having optical axes inclined relative to the mid-axis of the crystal wafer to cause a laser beam propagating inside the resonator mirror configuration to strike the at least one folding mirror at an oblique angle.

In other words, the laser according to the invention has a crystal wafer as its active laser medium. One flat side of the wafer is totally reflective, and a resonator mirror configuration is assigned to the crystal wafer, which comprises a semitransparent output mirror and at least one folding mirror, which are spatially separated from the crystal wafer and whose optical axes are inclined with respect to the mid-axis of the crystal wafer so that the laser beam propagating inside the resonator mirror configuration strikes the folding mirror or mirrors at an oblique angle. Owing to this obliquely angled arrangement of the at least one external folding mirror, the excitation surface is subdivided according to the number of mirrors used in the resonator mirror configuration into smaller sub-surfaces or segments, through which the generated laser beam passes in succession. The dimensions of the laser beam are thereby reduced and its beam quality is correspondingly increased. Since the crystal wafer is furthermore crossed several times per circuit of the laser beam through the resonator and the gain is multiplied, it is possible to install an auxiliary element in the resonator, for example a Brewster plate for polarization or an acousto-optical crystal as a switch for the pulsed operation, especially when using crystal wafers with a relatively low gain, as is the case for example in a Yb:YAG crystal, without the losses due to this inside the resonator having a substantial effect on the laser power. Such an auxiliary element will, in particular, be arranged at a position through which the laser beam passes only once in a half circuit.

In this text, the term folding mirrors refers to optical elements which change the propagation direction of a light beam striking them by reflection. In this context, a folding mirror may also be constructed from a multiplicity of reflective surfaces, for example in the form a deviating prism. The optical axis of such a mirror configuration, constructed from a multiplicity of reflective surfaces, is the axis for which a light beam propagating along this axis is reflected back on itself, i.e. reflected through 180°.

In accordance with an added feature of the invention, a pump light source for generating a pump light beam is disposed to illuminate an excitation surface on a flat side of the crystal wafer opposite the above-mentioned totally reflective flat side; and the folding mirror or folding mirrors are disposed to optically couple together sub-surfaces of the excitation surface respectively assigned to one another pairwise.

In accordance with an additional feature of the invention, the sub-surfaces are spatially separated from one another.

In accordance with another feature of the invention, the sub-surfaces fully cover the excitation surface.

In accordance with a preferred embodiment of the invention, the excitation surface is square.

In accordance with again an added feature of the invention, the totally reflective flat side of the crystal wafer is also utilized as a totally reflective end mirror.

In accordance with a concomitant feature of the invention, there is provided an auxiliary optical element for influencing properties of a laser beam inside the resonator formed by the crystal wafer and the resonator mirror configuration.

Other features which are considered as characteristic for the invention are set forth in the appended claims.

Although the invention is illustrated and described herein as embodied in a solid state laser, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
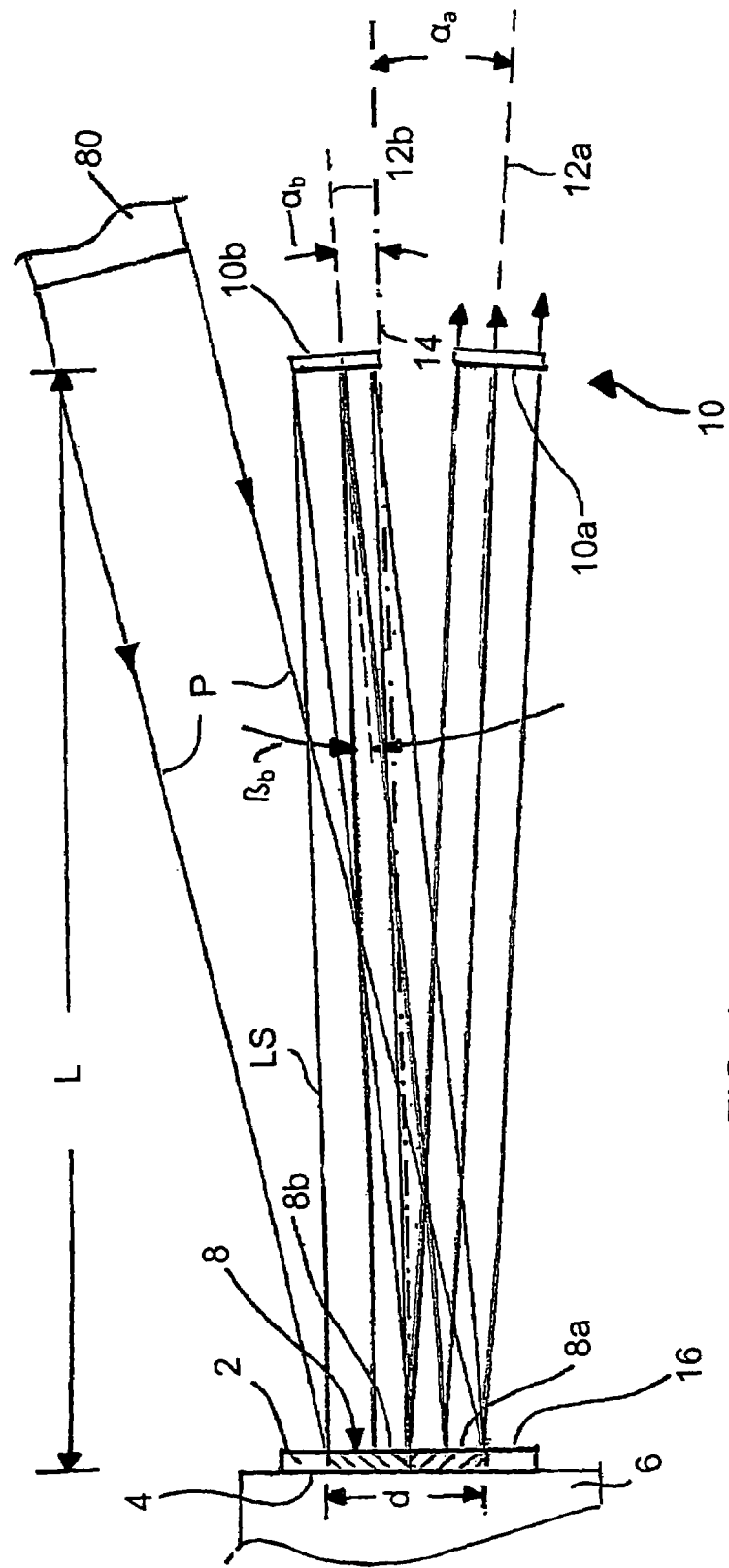
FIG. 1 is a schematic side view of a solid state laser according to the invention.

Referring now to the figures of the drawing in detail and first, particularly, to FIG. 1 thereof, a solid state laser contains a crystal wafer 2 as the active laser medium. The wafer 2 is disposed with one flat side 4 on a cooling element 6 indicated only schematically in the figure. The flat side 4 facing the cooling element 6 is provided with a totally reflective layer. The crystal wafer 2 is exposed longitudinally to a pump light beam P on an excitation surface 8, the geometrical shape and extent of which are determined by the cross-sectional shape of the pump light beam P generated by a pump light source 80, so that a volume region indicated by shading is actively employed.

The crystal wafer 2 is assigned an external resonator mirror configuration 10 which, in the exemplary embodiment, comprises a semitransparent output mirror 10a and a folding mirror 10b. The output mirror 10a and the folding mirror 10b are arranged with their normals, or with their optical axes 12a and 12b in the event that curved mirror surfaces are used, inclined by the angles $\alpha_a$ and $\alpha_b$ with respect to the mid-axis 14 of the crystal wafer 2, and they divide the excitation surface 8 into two sub-surfaces 8a and 8b. In the exemplary embodiment, the totally reflective flat side 4 of the crystal wafer 2 is used both as an end mirror and as a folding mirror. A laser beam LS emerging from an arbitrary point of the sub-surface 8 and propagating parallel to the mid-axis 14 strikes the folding mirror 10b and is projected by it onto the sub-surface 8a. The laser beam LS reflected from the sub-surface 8a is reflected toward the output mirror 10a, which it strikes perpendicularly and is partially reflected back on itself. The folding mirror 10b is thus used for optically coupling the sub-surfaces 8a and 8b.

Like the external mirror of the resonator configuration, the flat side 16 of the crystal wafer 2 which faces away from the cooling element 6, and is exposed to the pump light beam P, may be curved.

The optical axis 12a of the output mirror 10a is inclined relative to the mid-axis 14 by an angle $\alpha_a = d/2L$ (L>>d), where d is the extent of the excitation surface 18 in the folding plane which extends parallel to the plane of the drawing in the figure, and L is the length of one branch of the resonator. Correspondingly, the optical axis 12b of the folding mirror 10b is inclined by the angle $\alpha_b = \alpha_a/2$ relative to the mid-axis 14. So that the laser beam LS is deviated by the folding mirror 10b onto another subregion 8a or 8b, it is necessary for the laser beam LS to strike the folding mirror at a non-90° angle $\beta_b$, which equals $\alpha_b/2$ in the exemplary embodiment.

In the exemplary embodiment, the sub-surfaces 8a, 8b are spatially separated from each other, i.e. they do not overlap, but are merely next to each other. In principle, however, mirror configurations wherein the subregions partially overlap are also possible.

Figure 2:
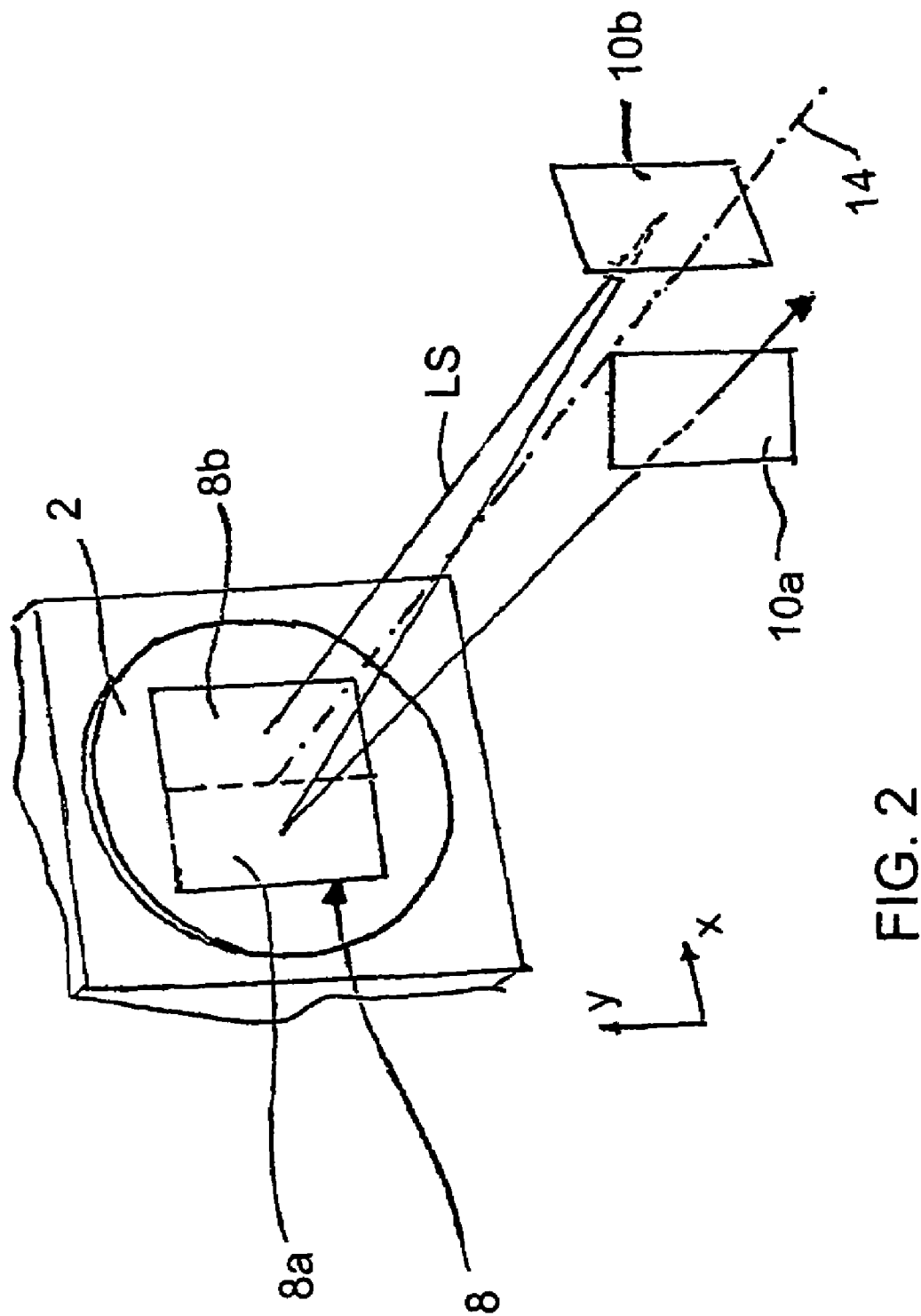
FIG. 2 is a schematic perspective view of the solid state laser according to the invention.

According to FIG. 2, the excitation surface 8 is square. This beam shape is due to the use of a diode laser constructed from a multiplicity of stacked diode laser bars as the pump light source, wherein the individual laser beams emerging from the diode laser bars have a rectangular beam profile which is converted by geometrical beam shaping into a square beam profile with an approximately equal beam quality in mutually orthogonal axes (cf. German patent DE 198 46 532 C2). The output mirror 10a and the folding mirror 10b separate the square excitation surface 8 into two rectangular sub-surfaces 8a, 8b which adjoin each other without a gap and cover the entire excitation surface 8. By halving the beam cross section in the direction of the x axis, the beam quality of the laser beam LS is improved compared with a conventional resonator design.

Figure 3:
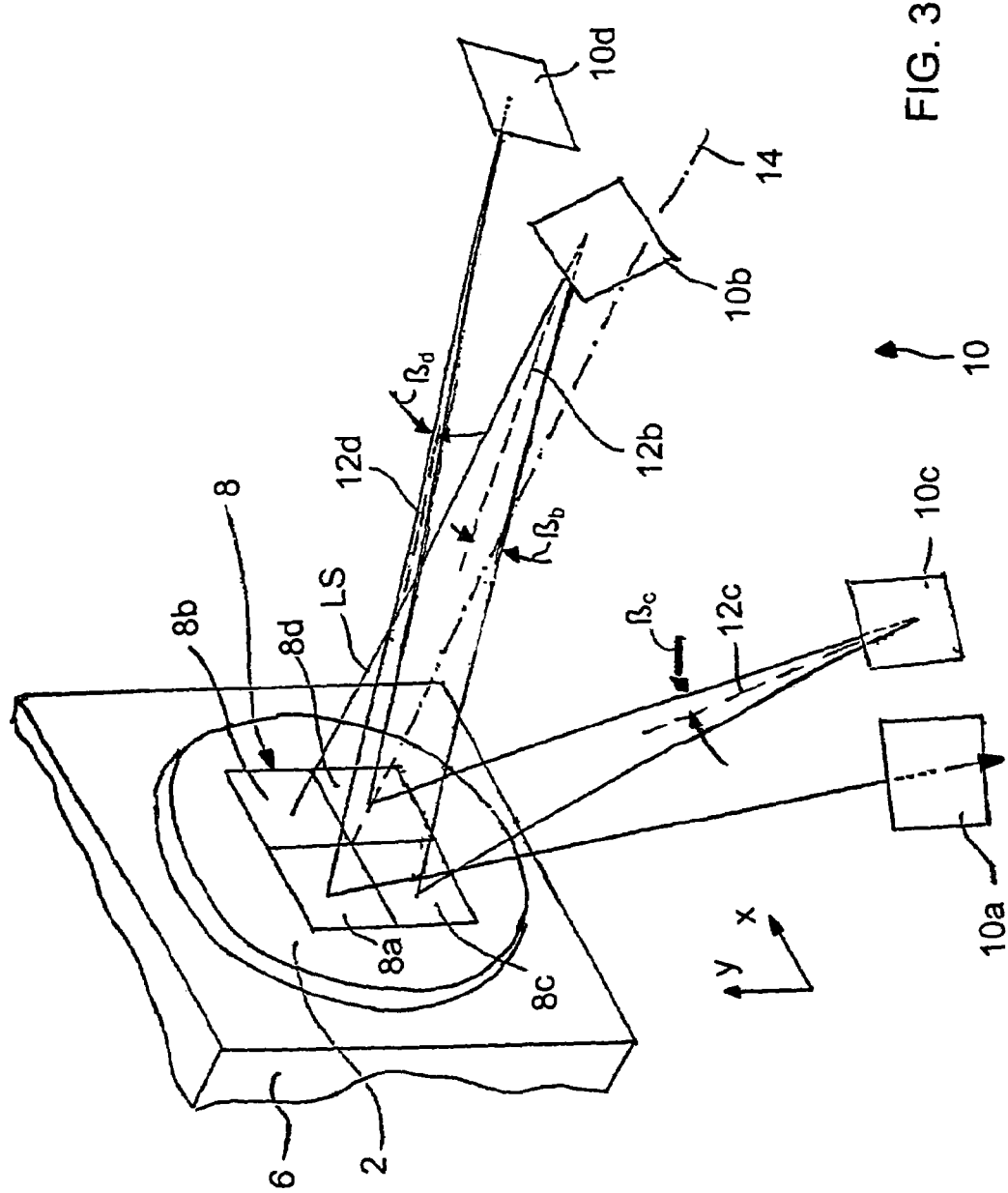
FIG. 3 is a schematic perspecitve view of a further embodiment of the solid state laser according to the invention.

In the particularly preferred configuration according to FIG. 3, segmentation of the square excitation surface into four likewise square sub-surfaces 8a-8d is achieved by using three folding mirrors 10b, 10c, 10d. The output mirror 10a and the folding mirrors 10b-10d are arranged so that a laser beam LS starting from the sub-surface 8b, perpendicularly to the surface of the sub-surface 8b (parallel to the mid-axis 14), is deviated toward the diagonally opposite sub-surface 8c by the folding mirror 10b.

There, it is reflected toward the folding mirror 10c which deviates it onto the sub-surface 8d. The laser beam reflected from this sub-surface 8d travels via the folding mirror 10d and the sub-surface 8a to the output mirror 10a, which it strikes perpendicularly. In this embodiment as well, the folding mirrors 10b-d optically couple together two respective sub-surfaces spatially separated from each other (folding mirror 10b couples the sub-surfaces 8b and 8c, folding mirror 10c couples the sub-surfaces 8c and 8d, folding mirror 10d couples the sub-surfaces 8d and 8a).

In this configuration, the transverse dimensions of the laser beam LS are halved both in the x direction and the y direction, so that the beam quality is improved at least approximately to the same extent in both directions.

The structure is represented only schematically in the figure. In order to allow a space-saving design which is simple in terms of manufacturing technology, it is favorable to arrange the folding mirrors 10b-10d on a common substrate.

Figure 4:
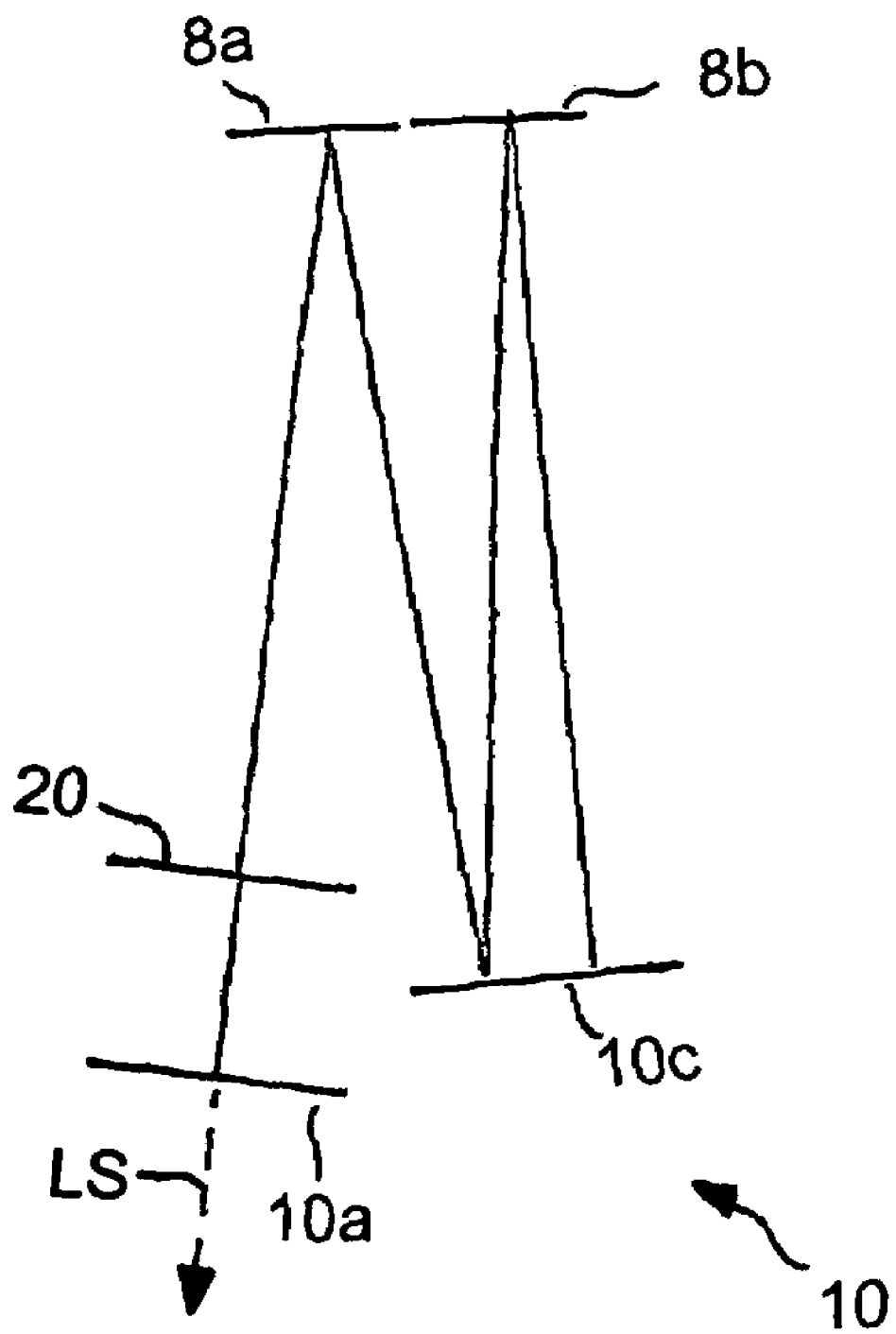
FIG. 4 is a side-view conceptual representation of a further exemplary resonator mirror configuration.

The exemplary embodiment according to FIG. 4 illustrates a resonator mirror configuration 10 wherein the totally reflective flat side 4 of the crystal wafer 2 does not act as an end mirror, but instead an external end mirror 10e is employed. In this resonator mirror configuration 10, this external end mirror 10e also acts as a folding mirror and is struck two times per half circuit of the laser beam LS through the resonator. An auxiliary optical element 20 which can influence the properties of the laser beam, for example a Brewster plate or an acousto-optical crystal, is arranged before the output mirror 10a inside the resonator formed by the crystal wafer 2 and the resonator mirror configuration 10.

The invention is not limited to arrangements having one or three folding mirrors. Folding mirror configurations which make the laser beam strike a sub-surface several times in a half circuit are also possible. The excitation surface 8 may likewise have a different shape, for example circular, instead of a square shape.

We claim:

1. A solid state laser, comprising:
   a crystal wafer forming an active laser medium of the laser, said crystal wafer having a totally reflective flat side and having a mid-axis;
   said crystal wafer being formed with an excitation surface on a flat side opposite said totally reflective flat side;
   a pump light source for generating a pump light beam disposed to illuminate said excitation surface of said crystal wafer;
   a resonator mirror configuration spatially separated from said crystal wafer, said resonator mirror configuration including a semitransparent end mirror and at least one folding mirror having optical axes inclined relative to said mid-axis of said crystal wafer to cause a laser beam propagating inside said resonator mirror configuration to strike said at least one folding mirror at an oblique angle, thereby subdividing the excitation surface into smaller sub-surfaces, through which the generated laser beam passes in succession, so that said folding mirror or folding mirrors are disposed to optically couple together sub-surfaces of said excitation surface respectively assigned to one another pairwise.

2. The solid state laser according to claim 1, wherein said sub-surfaces are spatially separated from one another.

3. The solid state laser according to claim 1, wherein said sub-surfaces fully cover said excitation surface.

4. The solid state laser according to claim 1, wherein said excitation surface is square.

5. The solid state laser according to claim 1, wherein said totally reflective flat side of said crystal wafer is also utilized as a totally reflective end mirror.

6. The solid state laser according to claim 1, which further comprises an auxiliary optical element for influencing properties of a laser beam disposed inside a resonator formed by said crystal wafer and said resonator mirror configuration.

* * * * *